(12) United States Patent
Schindler (10) Patent No.: US 8,621,176 B2
(45) Date of Patent: Dec. 31, 2013

(54) METHOD AND SYSTEM FOR ALLOCATING DATA OBJECTS FOR EFFICIENT READS IN A MASS STORAGE SUBSYSTEM

(75) Inventor: Jiri Schindler, Jamaica Plain, MA (US)

(73) Assignee: NetApp, Inc., Sunnyvale, CA (US)

( * ) Notice: Subject to any disclaimer, the term of this patent is extended or adjusted under 35 U.S.C. 154(b) by 764 days.

(21) Appl. No.: 12/690,849

(22) Filed: Jan. 20, 2010

(65) Prior Publication Data

US 2011/0179232 A1    Jul. 21, 2011

(51) Int. Cl.
*G06F 13/00* (2006.01)
(52) U.S. Cl.
USPC ............................ 711/173; 711/112; 711/154
(58) Field of Classification Search
USPC .......................................... 711/112, 154, 173
See application file for complete search history.

(56) References Cited

U.S. PATENT DOCUMENTS

| | | | | |
|---|---|---|---|---|
| 5,909,693 A * | 6/1999 | Martini | | 711/114 |
| 5,987,479 A * | 11/1999 | Oliver | | 1/1 |
| 6,009,481 A * | 12/1999 | Mayer | | 710/33 |
| 6,191,912 B1 * | 2/2001 | Gaertner et al. | | 360/78.04 |
| 6,366,980 B1 * | 4/2002 | Haines et al. | | 711/112 |
| 6,445,531 B1 * | 9/2002 | Gaertner et al. | | 360/78.06 |
| 6,658,196 B2 * | 12/2003 | Sakai et al. | | 386/281 |
| 6,871,011 B1 * | 3/2005 | Rahman et al. | | 386/293 |
| 8,359,430 B1 * | 1/2013 | Fair | | 711/113 |
| 2002/0108016 A1 * | 8/2002 | Haines et al. | | 711/112 |
| 2002/0161911 A1 * | 10/2002 | Pinckney et al. | | 709/231 |
| 2004/0130814 A1 * | 7/2004 | Hagihara et al. | | 360/15 |
| 2009/0141607 A1 * | 6/2009 | Wang et al. | | 369/86 |
| 2009/0228535 A1 | 9/2009 | Rathi et al. | | |
| 2011/0066768 A1 * | 3/2011 | Brittner et al. | | 710/18 |

OTHER PUBLICATIONS

Schlosser, S., et al., "On Multidimensional Data and Modern Disks," Proceedings of the 4th USENIX Conference on File and Storage Technology (FAST '05), San Francisco, CA, Dec. 13-16, 2005 (14 pgs.).

* cited by examiner

*Primary Examiner* — Reba I Elmore
(74) *Attorney, Agent, or Firm* — Perkins Coie LLP (57) ABSTRACT

A system and method for allocating data objects across multiple physical storage devices in a mass storage subsystem first determines a set of physical properties associated with the physical storage devices. The system assigns portions of the mass storage subsystem to a first division or a second division based on the physical properties, such that read operations directed to logically related data stored in the first division can be executed more efficiently than read operations directed to data stored in the second division. During operation, the system stores data objects with a low SLR in the second division, which may be allocated according to any well-known file system. If a write request is for a new data object with a high SLR, the system stores the new data object in a set of neighboring primary data chunks in the first division. For subsequent write requests that modify a stored data object, the system stores the modified data in a spillover data chunk located in proximity to the primary data chunk.

25 Claims, 9 Drawing Sheets

METHOD AND SYSTEM FOR ALLOCATING DATA OBJECTS FOR EFFICIENT READS IN A MASS STORAGE SUBSYSTEM

BACKGROUND

A network storage server is a processing system that is used to store and retrieve data on behalf of one or more hosts (clients) on a network. A storage server operates on behalf of one or more hosts to store and manage data in a set of mass storage devices, such as magnetic or optical storage-based discs or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other servers are capable of servicing both file-level requests and block-level requests, as is the case with certain storage servers made by NetApp, Inc. of Sunnyvale, Calif.

A storage server typically uses a mass storage subsystem to store and retrieve data at the request of hosts. As used herein, a "mass storage subsystem" is a set of one or more physical storage devices configured for use by a storage server. A mass storage subsystem may be, for example, a set of hard drives or solid state devices (SSD) configured in a RAID configuration. Data is stored on the physical storage devices according to a data layout defined by the file system. As used herein, a "file system" is an independently managed, self-contained, organized structure of data units (e.g., files, blocks, or logical unit numbers (LUNs)). The data layout specifies how these data units are divided and stored at various physical locations in the mass storage subsystem. Aspects of the data layout may be controlled to achieve various performance goals. For example, some layouts, such as the proprietary Write Anywhere File Layout file (WAFL™) system developed by NetApp, Inc., are used as part of "write anywhere" file systems, which are not constrained to write any particular data or metadata to a particular storage location or region. Rather, write-anywhere systems can write to any unallocated block on any available mass storage device and do not overwrite data on the devices. As a result, these write-anywhere file systems can achieve high efficiency for write operations. However, write-anywhere systems may be slower for read operations, because data stored in a write-anywhere system can quickly become fragmented over a wide area on the physical storage devices. Other file systems may be designed to shift the balance in the other direction, such that read performance is improved at the expense of write performance. Accordingly, existing systems tend to be optimized for a particular type of workload (e.g., reads or writes) at the expense of other types of workloads.

SUMMARY

The present disclosure relates to a system and method for allocating data objects across one or more physical storage devices (e.g., hard drives, SSDs) in a mass storage subsystem. The system provides high read performance for data objects with a high service level requirement (SLR) while still supporting write anywhere operation by using physical properties of the physical storage devices to allocate the storage. The system first determines a set of physical properties associated with the physical storage devices, such as track size, block size, or seek speed. The system then assigns portions of the mass storage subsystem to a first division or a second division based on the set of physical properties, such that read operations directed to data stored in the first division can be executed more efficiently than read operations directed to data stored in the second division. The first division includes a set of primary data chunks, which are not adjacent but are separated by less than a maximum distance determined based on the physical properties of the storage devices, and spillover data chunks, which are located in proximity to corresponding primary data chunks.

During operation, the system evaluates write requests to determine if the write request is for a data object with a high SLR. The system stores all data objects with a low SLR in the second division, which consists of a set of "residual chunks" and may be allocated according to a data layout of any known or convenient file system. Otherwise, if a write request is for a new data object with a high SLR, the system stores the new data object in a set of neighboring primary data chunks in the first division. For a subsequent write request that modifies a stored data object, the system stores the modified data in a spillover data chunk located in proximity to the primary data chunk.

Because data chunks in the first division are assigned according to physical properties of the mass storage subsystem, requests to read data in the first division can be executed quickly even after the data has been modified multiple times. In contrast, read performance in the second division may deteriorate over time as the data is modified and becomes fragmented. An advantage of this system is that it supports multiple SLRs and provides improved read performance for data objects with a high SLR. Differing levels of performance can be configured for individual data objects based on system-level needs. For example, the system may be configured to provide a high SLR for files that are used for managing the storage server because the files are likely to be read and modified frequently. An administrator might also configure the system to support a high SLR for data objects that are particularly important for ongoing business operations and are accessed frequently. The system provides higher performance for data in the first division without unnecessarily reducing performance for data objects with a low SLR, which can be stored according to a prior art data layout in the second division independently of the data stored in the first division.

DETAILED DESCRIPTION

A system and method for allocating data objects in a mass storage subsystem is disclosed (hereinafter referred to as "the data layout system" or "the system"). The system defines a data layout in a mass storage subsystem that has multiple physical storage devices, such as hard drives or SSDs. The system divides the storage provided by the mass storage subsystem into at least two divisions based on physical properties of the physical storage devices. The divisions are logical divisions and are not required to coincide with physical device boundaries. The divisions are defined such that read access to data in a first division is faster than read access to data in a second division. During operation, the system evaluates each incoming write request to determine an SLR of a data object (e.g., file, LUN, block, etc.) associated with the incoming write request. The system then stores the data object in the either the first portion or the second portion depending on the associated SLR.

The data layout divides the available storage into primary data chunks and spillover data chunks, which are assigned to the first division of the mass storage subsystem, and residual data chunks, which are assigned to the second division. A data chunk is a unit of storage space that can be used to store a data object and represents the smallest unit of space that can be allocated to a division of the mass storage subsystem. The system specifies the size of the data chunks and their placement based on the physical properties. To define the data layout, the system first determines a set of physical properties of the multiple physical storage devices. The physical properties may include a track size or seek profile (for hard drives) and a block size or number of channels (for SSDs). The system then uses the physical properties to determine the width of the individual data chunks. In some embodiments, the chunk width is selected to be the maximum size that can be read from the storage device in a single read operation (i.e., the block size or track size of the physical storage devices).

After defining the chunk width, the system also determines a maximum distance between primary data chunks. The maximum distance is determined based on the seek curve of the physical storage devices and is generally equal to the largest distance that the device can seek where the seek time is approximately constant. The system then assigns a set of non-adjacent primary data chunks to the first division of the mass storage subsystem. The primary data chunks are separated by a distance less than the maximum distance, such that a seek between two primary data chunks takes the same time as a seek between adjacent chunks. The system then defines a set of spillover data chunks in proximity to the primary data chunks. The remaining storage in the mass storage subsystem (referred to as "residual chunks") is then assigned to the second division.

During operation, the system evaluates each write request to determine whether a data object associated with the write request has a high SLR. If the data object has a low SLR, the system stores the object in the second division according to a data layout of any known or convenient file system. If the data object has a high SLR, the system stores the object in the first division. The first time a data object is written to the first portion, the system stores the data in neighboring primary data chunks. When the system receives a subsequent write request that modifies data in a primary data chunk, it writes the modified data in one or more spillover data chunks located proximate to the primary data chunk being modified. By doing so, the system ensures that the physical storage device can seek to the modified data in the spillover data chunk as quickly as it can seek to the original data in the primary data chunk. The system may also be configured to selectively divide the data object over multiple physical storage devices to use parallel read and write operations to improve performance.

Figure 1:
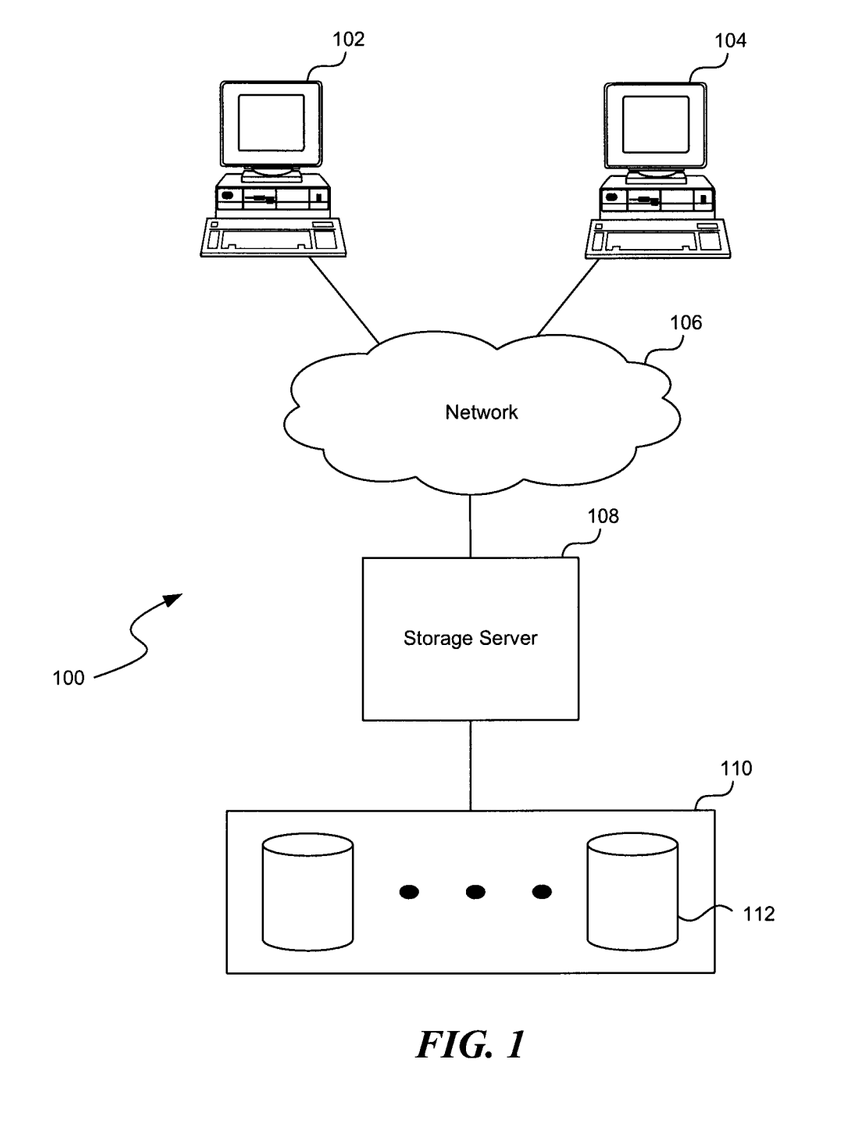
FIG. 1 illustrates a network environment which includes a storage server coupled to a storage subsystem.

FIG. 1 is a network diagram of an environment 100 in which the data layout system can operate. The various embodiments described herein are not limited to any particular environment, and may be implemented in various types of storage systems. In the present illustration, the environment 100 includes a storage server 108 which can implement the data layout techniques introduced here. The storage server 108 is coupled with a mass storage subsystem 110, which includes a set of physical storage devices 112, and to clients 102 through a network 106, such as a local area network (LAN) or other type of network. Each of the clients 102 may be, for example, a conventional personal computer (PC), workstation, or the like. The storage server 108 is also coupled to a management server 104, which includes management software configured to allow an administrator to manage the storage server 108 and the mass storage subsystem 110. The mass storage subsystem 110 is managed by the storage server 108. For example, the storage server 108 can receive and respond to various read and write requests from the clients 102, directed to data stored in or to be stored in the storage subsystem 110. The physical storage devices 112 in the mass storage subsystem 110 may be, for example, magnetic disks, SSDs, optical disks such as compact disksread only memory (CD-ROM) or digital versatile/video disks (DVD)-based storage, magneto-optical (MO) storage, tape-based storage, or any other type of non-volatile storage devices suitable for storing large quantities of data.

The storage server 108 may have a distributed architecture; for example, it may include separate N-module (network module) and D-module (data module) components (not shown). In such an embodiment, the N-module is used to communicate with the clients 102, while the D-module includes the file system functionality and is used to communicate with the mass storage subsystem 110. In another embodiment, the storage server 108 may have an integrated architecture, where the network and data components are all contained in a single box or unit. The storage server 108 further may be coupled through a switching fabric to other similar storage systems (not shown) that have their own local storage subsystems. In this way, all of the storage subsystems can form a single storage pool, to which any client of any of the storage systems has access.

Figure 2:
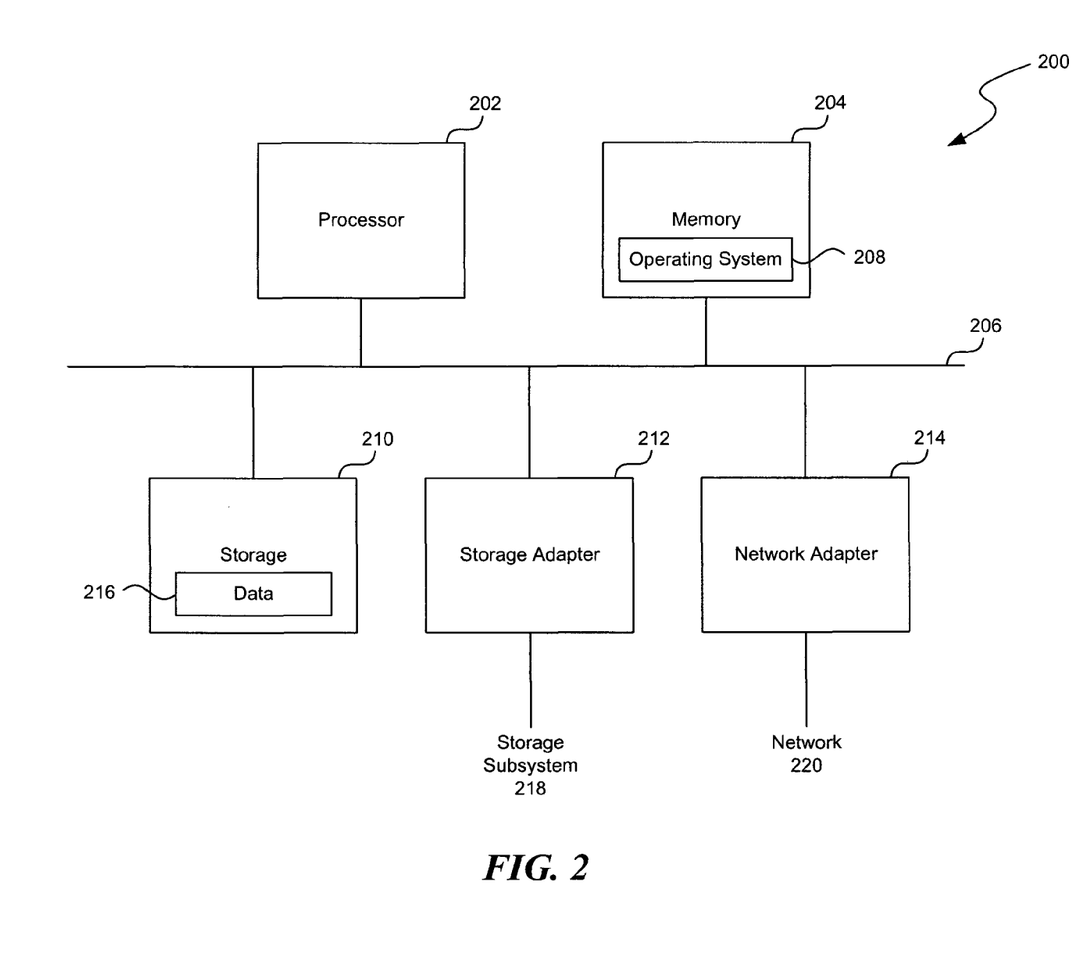
FIG. 2 is an example of the hardware architecture of a storage server.

FIG. 2 is a high-level block diagram showing an example of the architecture of a storage server 200. The storage server 200 may represent the storage server 108 of FIG. 1. The storage server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 202 may include central processing units (CPUs) of the storage server 200 and, thus, control the overall operation of the storage server 200. In certain embodiments, the processor(s) 202 accomplish this by executing software or firmware stored in memory 204. The processor(s) 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 204 is or includes the main memory of the storage server 200. The memory 204 represents any form of random access memory (RAM), read-only memory (ROM), flash memory, or the like, or a combination of such devices. In use, the memory 204 stores, among other things, a storage operating system 208 of the storage server 200.

A storage adapter 212 and a network adapter 214 are also connected to the processor(s) 202 through the interconnect 206. The storage adapter 212 allows the storage server 200 to access a storage subsystem 218 and may be, for example, a Fibre Channel adapter or a SCSI adapter. The network adapter 214 provides the storage server 200 with the ability to communicate with remote devices, such as clients, over a network 220 and may be, for example, an Ethernet adapter. The storage server 200 may further include local storage 210 coupled to the interconnect 206.

Figure 3:
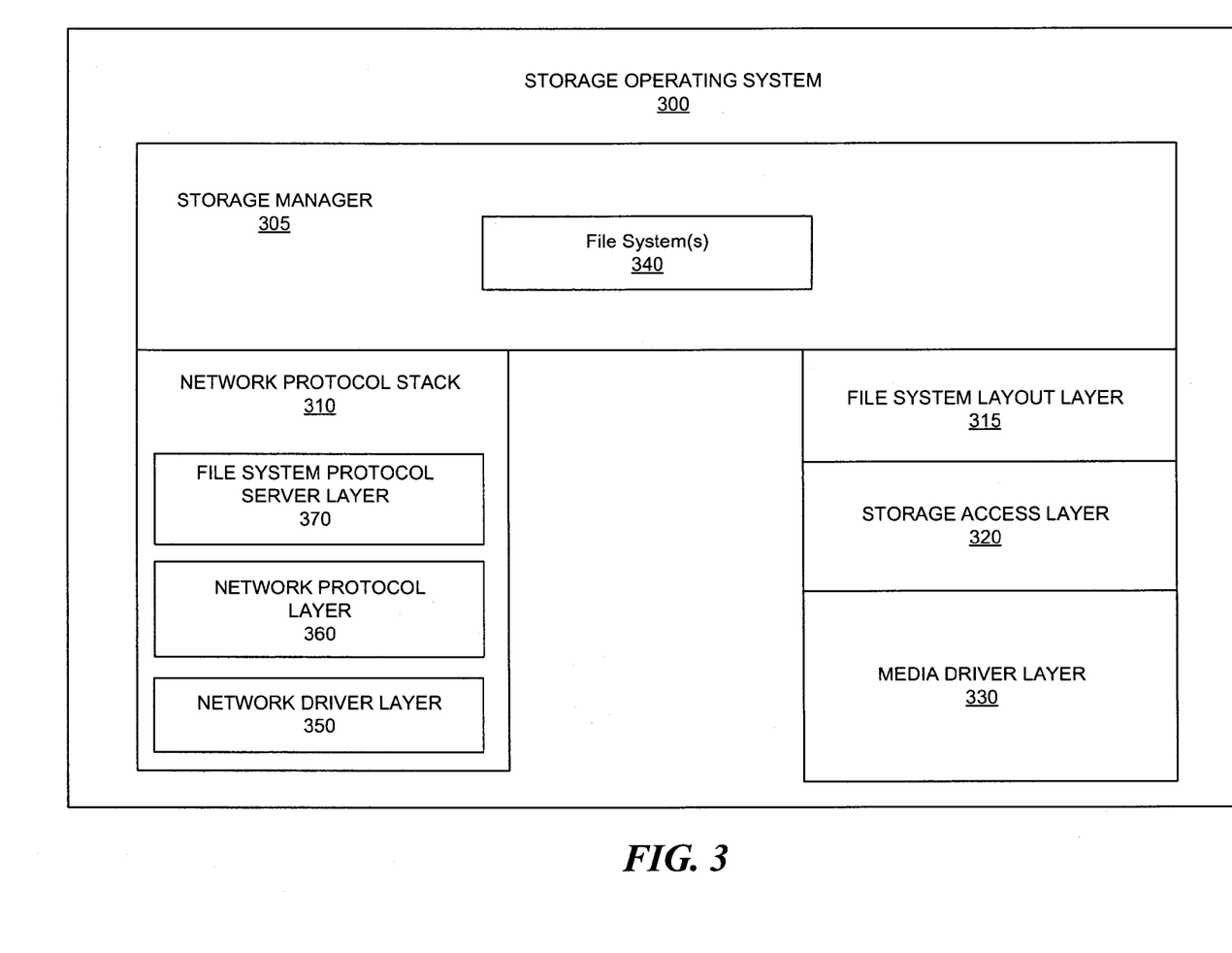
FIG. 3 is a block diagram of a storage operating system.

FIG. 3 is a block diagram of a storage operating system 300 according to an illustrative embodiment. As used herein, the term "storage operating system" generally refers to the computer-executable code operable on a computer to perform a storage function that manages data access and other related functions. Storage operating system 300, which can be the storage operating system 208 in FIG. 2, can be implemented as a microkernel, an application program operating over a general-purpose operating system such as UNIX® or Windows NT®, or as a general-purpose operating system configured for the storage applications as described herein. In the illustrated embodiment, the storage operating system 300 includes a network protocol stack 310 having a series of software layers including a network driver layer 350 (e.g., an Ethernet driver), a network protocol layer 360 (e.g., an Internet Protocol layer and its supporting transport mechanisms: the TCP layer and the User Datagram Protocol layer), and a file system protocol server layer 370 (e.g., a CIFS server, a NFS server, etc.). In addition, the storage operating system 300 includes a storage access layer 320 that implements a storage media protocol such as a RAID protocol, and a media driver layer 330 that implements a storage media access protocol such as, for example, a Small Computer Systems Interface (SCSI) protocol. The storage operating system 300 also includes a file system layout layer 315, which specifies a layout of data on the physical storage devices and provides an interface between the storage manager 305, which uses logical (i.e., device-independent) addresses, and the storage access layer 320, which directly addresses locations on the physical storage devices. As discussed in detail below, the data layout system may be implemented by the file system layout layer 315. Any and all of the modules of FIG. 3 can be implemented as a separate hardware component. For example, the storage access layer 320 may alternatively be implemented as a parity protection RAID module and embodied as a separate hardware component such as a RAID controller. Bridging the storage media software layers with the network and file system protocol layers is the storage manager 305 that implements one or more file system(s) 340.

Figure 4A:
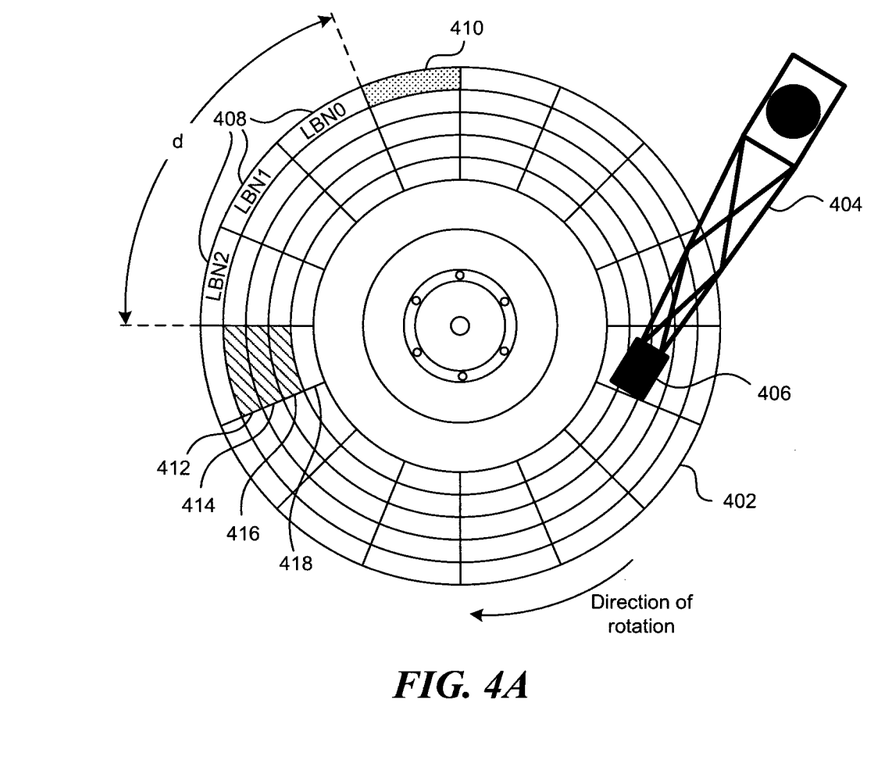
FIG. 4A illustrates an exemplary layout of sectors on a hard drive.

FIG. 4A illustrates an exemplary layout of sectors on a hard drive 400. The hard drive 400 includes at least one platter 402 and an associated drive arm 404. The drive arm 404 is moves a drive head 406, which is used to read and write data to the platter 402. Although only one surface of a single platter is shown in FIG. 4A, hard disks may have multiple platters and generally store data on both sides of each platter. In general, each side of a platter has at least one drive head. The platter 402 is divided into multiple blocks 408 (also referred to as sectors), which each store a fixed amount of data. The blocks 408 are arranged in concentric rings, referred to as tracks, which contain a fixed number of blocks (e.g., each track of the platter 402 includes 16 blocks).

The firmware of the hard drive 400 maps the blocks 408 into a logical address space, such that each block 408 can be addressed with a single numerical address, referred to as the logical block number (LBN). From the perspective of higher layers (e.g., the storage manager 305 of FIG. 3), the hard drive 400 is accessed as a single linear address space. The logical address space is discussed in greater detail below with reference to FIG. 4C. The hard drive 400 maps the blocks 408 by determining a logical order, such that the time to move between adjacent blocks is minimized. In this context, a first block is "adjacent" to a second block if the LBN of the first block is one greater than the LBN of the second block. To map the blocks, the hard drive 400 designates a selected block as LBN 0 and assigns LBNs to the remaining blocks 408 based on that starting point. LBN 0 is generally located on the outermost track of a platter, but may be located elsewhere, such as the innermost track. After designating LBN 0, the hard drive 400 numbers neighboring blocks on the track in the order that they can be accessed (i.e., based on the spin direction of the platter 402) until the last block 410 in the first track has been numbered.

The hard drive 400 then moves to the next track and begins numbering blocks on that track. Because the drive head 406 takes a certain amount of time to move between tracks, the first block of the new track will be slightly offset from the first block of the previous track. For example, in FIG. 4A, the hard drive 400 rotates a distance d (3 blocks) in the time it takes to move the drive head 404 to a new track. Thus, the first block 412 of the second track is shifted from LBN 0. The numbering process is then repeated for each track of the platter 402. The hard drive 400 may also be configured to switch sides of the platter (or to a new platter) after numbering a certain number of tracks on a particular side.

As stated above, in some embodiments the storage server manages the file system as a "write anywhere" file system, such as the proprietary WAFL file system developed by NetApp, Inc. Write-anywhere systems can write to any unallocated block on any available mass storage device and do not overwrite data on the devices. If a data block on disk is updated or modified with new data, the data block is thereafter stored (written) to a new location on disk instead of modifying the block in place to optimize write performance. Write performance in these systems is efficient because every write is handled by allocating a new data block, rather than requiring the mass storage subsystem to seek to the data block to be modified on a physical storage device before modifying the data block. Instead, the modified data may simply be written to any available location on the physical storage device.

Figure 4B:
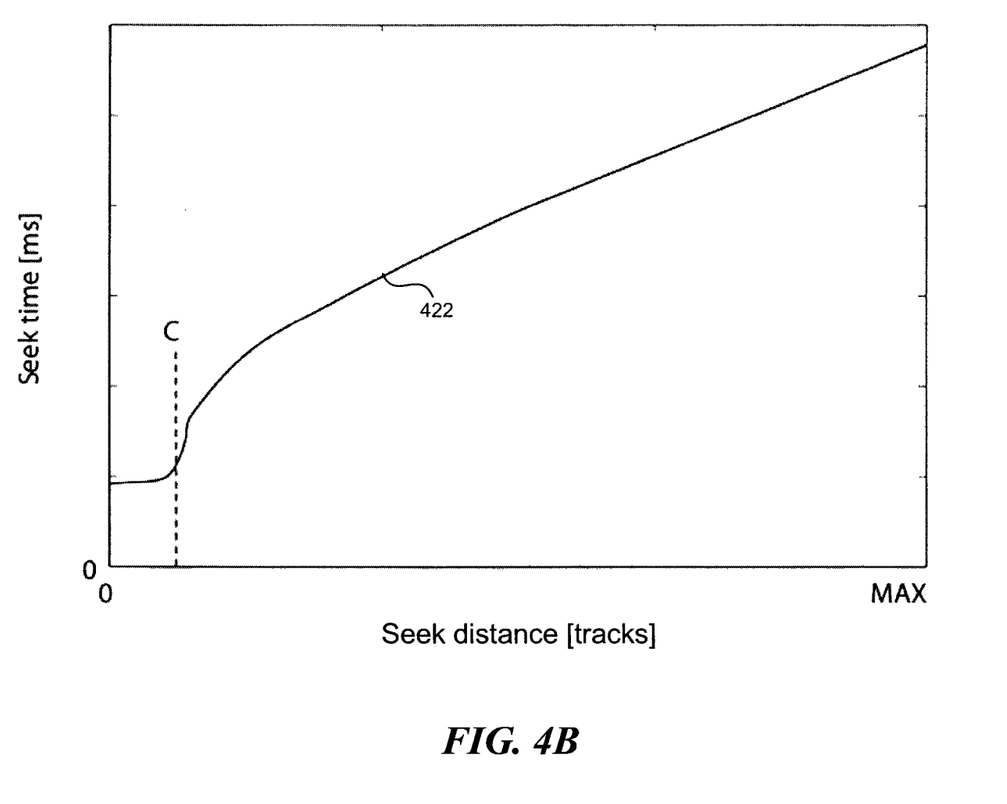
FIG. 4B illustrates a representative seek curve of a modern disk drive.

However, read performance can degrade over time in a write-anywhere, no-overwrite file system. Data blocks are initially chosen as available during a write operation, without particular provision for read performance. Even if data for a particular object is initially stored in physical proximity, the component data blocks generally become fragmented and spread out over the entire mass storage subsystem as the object's data blocks are modified over time. This problem is illustrated in part by FIG. 4B, which shows a representative seek curve 422 of a modern hard disk drive. As shown in FIG. 4B, seek time is substantially constant for seeks of a short distance (i.e., up to a threshold distance C tracks). For seeks of greater than C tracks, seek time increases as the seek distance increases. Thus, as the data blocks of an object become physically spread out, the time required for the mass storage subsystem to seek to each of the data blocks for a read operation increases significantly. Referring to FIG. 4A, this seek behavior means that the hard disk 400 can seek from block 410 to block 414 or block 416 in the same time that it would take to seek to block 412, while seeking to block 418 takes significantly longer.

Moreover, known file system data layouts do not provide for differing levels of service for different types of objects. Differing levels of service are useful when an administrator wants to request the storage system to provide a higher level of service (a "high SLR") to a particular set of objects. As used herein, a "high" SLR applied to a particular object is an indication to the storage system that the system should attempt to provide better performance under a particular metric (e.g., read speed or throughput) for the object than for other objects having a lower SLR. The SLR may be specified by data stored in the object or by a separate table or database that stores SLRs for multiple objects.

In one scenario, an administrator may use SLRs by assigning certain core business files a high SLR to ensure that they can always be accessed quickly. Alternatively, SLRs may be used in a cloud computing environment, where a service provider uses a set of storage systems to provide computing services to multiple customers that access the systems through the Internet. Currently, cloud computing providers offer multiple pricing tiers that are differentiated based on factors such as bandwidth or amount of storage required. In addition, a provider might also differentiate based on speed or response time for read or write requests. Such a provider could take advantage of multiple SLRs by using the SLR to define a more expensive tier of service for customers that want to guarantee better service. Thus, it would be useful to develop a system that can provide high read performance over time for high priority data objects, even in the face of multiple writes to the data objects.

Figure 4C:
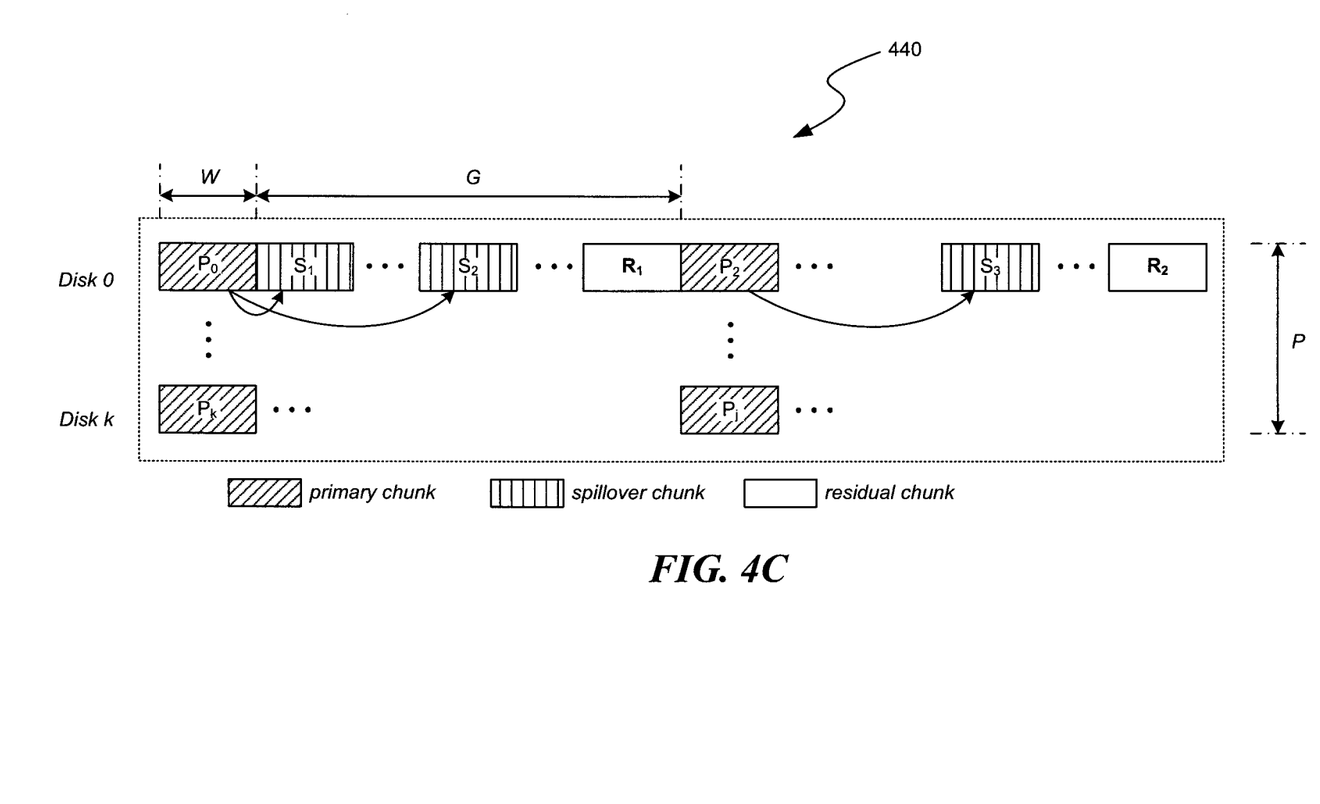
FIG. 4C illustrates a representative data layout suitable for implementing the data layout system.

FIG. 4C illustrates a representative data layout 440 suitable for implementing the data layout system. The layout 440 includes an allocation of the entire address space of an individual mass storage subsystem. The mass storage subsystem consists of P separate storage devices, of which disks 0 and k are individual examples. The address space for each disk is shown along the horizontal axis, starting from the lowest physical address on the left and increasing towards the right. The data layout 440 defines a first division that provides higher performance for data objects having a high SLR and a second division that provides a lower level of performance for data objects having a lower SLR. As used herein, an SLR refers to a set of performance requirements (e.g., write speed, read speed, etc.) the system must meet for a particular data object. In some embodiments, SLRs are specified for individual data objects or groups of data objects by an administrator based on an evaluation of which data objects require higher read performance over time. Alternatively, the system may automatically assign a high SLR to certain data objects, e.g., data objects of a certain class, such as system configuration objects.

As shown in FIG. 4C, the address space of each disk is divided into equal-sized data chunks of size W, including primary data chunks (e.g., chunks $P_0$ to $P_j$), spillover data chunks (e.g., chunks $S_1$ to $S_3$), and residual data chunks (e.g., $R_1$, $R_2$). The term "data chunk" is used here to indicate that the data may be grouped based on units different in size from data blocks commonly used in prior art file systems. For simplicity, FIG. 4C shows spillover data chunks and residual data chunks only on disk 0. However, in practice the data layout defines locations for spillover data chunks and residual data chunks on each of the physical storage devices in the mass storage subsystem. For example, an individual data chunk may be one or two megabytes in size, while a data block according to the prior art is commonly four kilobytes. The data chunk size is generally determined during an initial setup of the data layout system according to a process described below.

The file layout 440 initially includes a first set of data chunks that are referred to as "primary data chunks". As shown in FIG. 4C, primary data chunks $P_0$, $P_2$, $P_k$, and $P_j$ are physically separated on their individual disks by a distance G, which may be measured, for example, in terms of a number of tracks on a hard disk or blocks on an SSD. The process by which the system defines the data chunk width and the distance G is discussed in greater detail below. In general, G may be determined based on user-defined parameters, physical properties of the mass storage subsystem, or a combination of these factors. For example, in a hard drive or hybrid system, G is less than a maximum distance that is determined based on physical properties of the physical storage devices. In contrast, in an SSD system, G is determined based on user-defined parameters. For example, FIG. 4B shows that the seek time for seeks up to a distance C is substantially constant in a typical hard disk. In some embodiments, the system selects a maximum distance between primary blocks based on the maximum distance C that has a constant seek time for the particular physical storage devices. The system assigns primary data chunks $P_0$, $P_2$, etc. to the first division of the mass storage subsystem.

The data layout 440 also includes a set of spillover data chunks $S_1$, $S_2$, $S_3$, etc. Each of the spillover data chunks $S_1$, $S_2$, $S_3$ is located in proximity to an associated primary data chunk. In particular, spillover data chunks $S_1$ and $S_2$ correspond to primary data chunk $P_0$, while spillover data chunk $S_3$ corresponds to primary data chunk $P_1$. Spillover data chunks are also assigned to the higher performance division of the mass storage subsystem. Data chunks that are not allocated as either primary data chunks or spillover data chunks are designated as residual data chunks, such as residual data chunk $R_1$. Residual data chunks are allocated to the second division of the mass storage subsystem, which may be managed according to any data layout known in the art, such as the WAFL file system.

In general, the distance G between primary data chunks is significantly larger than the width W of an individual data chunk. For example, the width W may be selected based on a track size of a particular hard drive used in the mass storage subsystem, while the distance G may be hundreds of tracks. The track size is the smallest I/O size that provides efficient data transfer during a single read operation. In the data layout system, chunks are defined such that the hard drive reads one chunk at a time, which increases read performance because the system uses all data returned by each physical read operation. The distance G between primary data chunk $P_0$ and primary data chunk $P_1$ is limited by a maximum distance selected based on physical properties of the storage device. For example, for a hard drive, a seek between primary data chunk $P_0$ and primary data chunk $P_1$ is equivalent to (i.e., takes the same amount of time as) a seek between primary data chunk $P_0$ and spillover data chunk $S_1$.

SSDs have a similar set of parameters. In particular, for an SSD, the width W may be selected based on a block size of the SSD. As with the track size of a hard drive, the block size defines the smallest size that provides efficient data transfer during a single read operation. That is, a read operation that reads a full block of data will be faster than a read operation that reads the equivalent amount of data in multiple operations. Because SSDs do not have heads attached to arms with multiple actuators (or other physical components) that must be moved to read data, SSDs do not exhibit the seek behavior shown in FIG. 4B. For this reason, the parameter G is not limited by physical constraints. In some embodiments, the parameter G is selected to achieve a target size of the first division based on the total available storage space on the physical storage subsystem.

In operation, when the system receives a write request, it first determines if the object to be written has a high SLR or a low SLR. The SLR may be determined based on metadata in the write request or based on metadata stored by the file system. In some embodiments, the file system stores this metadata as a part of the object. Alternatively, the file system may store the information in a separate data structure that correlates the object to the metadata. Alternatively, the system may be configured to assign a high SLR to certain classes of data object, such as objects that store system configuration data. If the object has a low SLR, the system stores the object's data in residual data chunks according to the data layout being used to manage the lower performance division of the physical storage subsystem. However, if the object has a high SLR, the system stores the data in order in a set of neighboring primary data chunks. Because primary data chunks are separated by less than the maximum distance, seeks between the primary data chunks require a constant time; therefore, the system can read data from the primary data chunks as quickly as if the primary data chunks were adjacent on the physical storage device. Primary data chunks $P_k$ through $P_j$ on physical storage device k are generally assigned to the same locations on the physical storage device k as the corresponding primary data chunks for device 0. This allows maximum efficiency and parallelism, because the seek time from rest to a particular primary data chunk on device 0 will be the same as the seek time from rest to the corresponding primary data chunk on device k. In some embodiments, the system enables parallel read and write operations by storing data from a data object on multiple physical storage devices. In these embodiments, the system may use corresponding primary data chunks on each physical storage device so that the system can read data at the same rate from each device without delays for differing seek times in the individual devices.

After an object has been written to the primary data chunks in the data layout 420, the system provides write-anywhere handling of successive write requests as described herein. However, when the system receives a write request that modifies previously stored data, the system writes the data to a spillover data chunk located in proximity to the primary data chunk being modified, instead of simply writing the new data to any available data chunk. For example, if the system receives a write request that modifies the data in primary data chunk $P_0$, the system stores the modified data in spillover data chunk $S_1$ or $S_2$. Because the spillover data chunks are located near the corresponding primary data chunk (and within the maximum distance determined based on physical properties of the physical storage device), a physical storage device can seek to a spillover data chunk in the same time it would take to seek to the corresponding primary data chunk. Thus, the system retains full efficiency for read operations even after the data has been modified multiple times.

Figure 5:
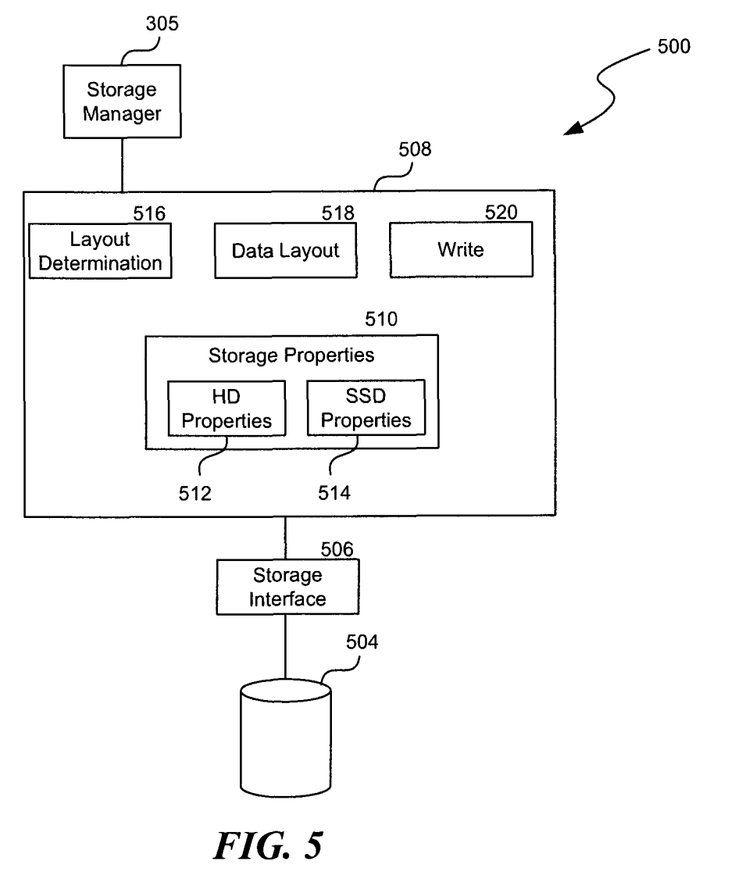
FIG. 5 is a logical block diagram of the data layout system according to a representative embodiment.

FIG. 5 is a logical block diagram of the data layout system 500 according to a representative embodiment. Functionality of the system 500 may be implemented by the file system layout layer 315 in a storage server, such as the storage server 108 of FIG. 1. Some or all aspects of the system 500 may be implemented as special-purpose hardware circuitry, programmable circuitry, or a combination of these. As will be discussed in additional detail herein, the system 500 includes a number of modules to facilitate the functions of the system.

Although the various modules are described as residing in a single server, modules are not necessarily physically co-located. In some embodiments, the various modules could be distributed over multiple physical devices and functionality implemented by the modules made and provided by calls to remote services. Similarly, the data structures could be stored in local storage or remote storage, and distributed in one or more physical devices. Assuming a programmable implementation, code to support the functionality of this system may be stored on a computer-readable medium such as an optical drive, flash memory, or a hard drive. One skilled in the art will appreciate that at least some of these individual components and subcomponents may be implemented using application-specific integrated circuits (ASICs), programmable logic devices (PLDs), or a general-purpose processor configured with software, firmware, or a combination thereof.

As shown in FIG. 5, the system 500 includes the storage manager 305, which was discussed above with reference to FIG. 3. The storage manager 305 communicates requests to a processing component 508, which manages the data layout of the mass storage subsystem 504. As discussed above with reference to FIG. 3, the layers of the storage operating system 300 are abstractions designed so that the internal operation of each layer can be changed without affecting overall operation of the other layers. Because the data layout is controlled by a lower layer of the storage operating system 300, the storage manager 305 may carry out higher layer functions as if it were communicating with a prior art file layout manager. Similarly, the processing component 508 processes requests from the storage manager 305 without regard for any particular processing or optimizations that are performed by those layers. For example, the storage manager 305 may be configured to optimize write behavior by aggregating multiple requests from a host 102 into a single write request that is handled by the processing component 508. From the perspective of the processing component 508, each write request is handled identically, regardless of whether the storage manager 305 aggregates requests or sends requests individually.

The system 500 also includes a mass storage subsystem 504, which stores the data managed by the system. As discussed above, the mass storage subsystem 504 includes a plurality of physical storage devices, such as hard drives or SSDs. The system 500 also includes a processing component 508, which manages the data layout of the mass storage subsystem 504. The processing component 508 may be implemented, for example, by the processor 202 of FIG. 2. The system 500 also includes a storage interface 506, which enables the processing component 508 to communicate with the mass storage subsystem 504.

The processing component 508 includes a storage properties component 510, which is configured to determine physical properties of the storage devices in the mass storage subsystem 504. Because the particular physical properties being determined vary depending on the underlying physical device, the storage properties component 510 may include multiple subcomponents configured to determine physical properties for particular types of physical storage devices. Thus, FIG. 5 shows that the storage properties component 510 includes a hard drive properties component 512 and an SSD properties component 514. The hard drive properties component is configured to determine physical properties of hard drives in the mass storage subsystem 504, such as the track size or the seek curve of the hard drives. Similarly, the SSD properties component 514 is configured to determine physical properties of SSDs in the mass storage subsystem 504, such as block size and seek speed. The block size of an SSD is equivalent to the track size of a hard drive—i.e., it defines the minimum amount of data that is read from the SSD in a single read operation.

The processing component 508 also includes a layout determination component 516, which is configured to use the physical properties determined by the storage properties component 510 to determine a data layout for the mass storage subsystem 504. The processing of the layout determination component 516 is discussed in greater detail below with reference to FIG. 6. The layout determination component 516 may also use user-defined parameters to determine the data layout. For example, an administrator may specify that the first portion and the second portion of the mass storage subsystem 504 are to be certain sizes. As discussed above, the layout determination component 516 uses the track size or block size for the physical storage devices and seek speed or other similar parameters to specify a data chunk size and to assign data chunks to the higher performance division or the lower performance division (and to particular types, such as primary data chunks or spillover data chunks). The system 500 then stores information defining the data layout in a data layout structure 518. The data layout structure 518 tracks data chunks assigned to the higher performance division and lower performance division and indicates the locations of spillover blocks provided by the system. The data layout structure 518 also provides a mapping between LBNs on the physical storage devices and chunks defined by the data layout. For example, the data layout structure 518 may store a list or set of LBNs corresponding to each data chunk in the higher and lower performance divisions.

The processing component 508 also includes a write component 520, which is configured to process write requests received from the network interface 502. In some embodiments, the write component 520 evaluates each received write request to determine if the object to be written has a high SLR. Alternatively, the write component 520 may simply determine whether the object has previously been assigned to the higher performance division or the lower performance division. The processing executed by the write component 520 is discussed in greater detail below with reference to FIG. 7.

Figure 6:
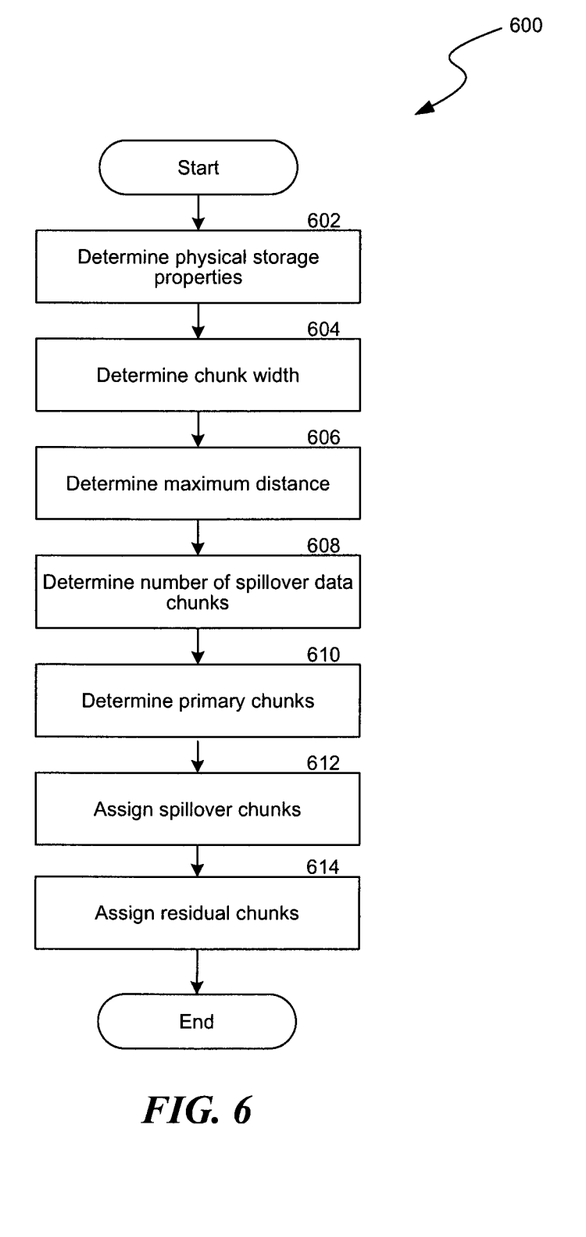
FIG. 6 is a flowchart of a process for determining a data layout according to the data layout system.

FIG. 6 is a flowchart of a process 600 for determining a data layout according to the data layout system. The steps of the process 600 can be executed by the storage properties component 510 and the layout determination component 516 of FIG. 5. As discussed above, these steps are carried out by the file system layout layer 315 of the storage operating system 300 (FIG. 3). Processing begins at step 602, where the system determines physical properties of the physical storage devices in the mass storage subsystem 504. As discussed above, these physical properties include track size, block size, and seek speed of the underlying physical storage component. In some configurations, the system determines these properties using a database of known types of physical storage devices. Alternatively, these properties may be determined by retrieving information from a data structure stored on the storage device. The system may also determine some parameters, such as seek speed, by executing a set of test operations on a physical storage device to estimate a value.

The system then uses the physical properties to define the parameters of the data layout. In particular, processing proceeds to step 604, where the system determines a width for data chunks used by the data layout. As discussed above, the chunk width is generally set equal to a track size for hard drives or a block size for SSDs, because this data size is the most efficient for retrieving data from the physical storage device. Processing then proceeds to step 606, where the system determines a maximum distance between primary chunks based on the physical properties. As discussed above, the maximum distance may be determined based on a combination of physical constraints, such as the seek profile of the physical storage device and the target size of the first division. Processing then proceeds to step 608, where the system determines the number of spillover data chunks. In general, this number is a configurable parameter that can be selected by an administrator during initial configuration or pre-determined by the file system configuration. In some embodiments, the number of spillover blocks is set equal to the number of write operations to an individual data chunk that the system will be configured to handle. For example, an administrator might specify that the system should have N spillover data chunk for each primary data chunk based on an expectation that the system will receive no more than N write requests to modify any data chunk during operation.

After the parameters have been determined, the system determines the data layout for the mass storage subsystem. In particular, processing proceeds to step 610, where the system assigns locations for the primary data chunks. As discussed above, the locations of the primary data chunks may be determined based on a combination of the physical properties of the mass storage subsystem and configuration parameters provided by an administrator. Thus, in one embodiment, the chunk width is determined based on physical properties, while the distance between primary data chunks may be determined in part based on configuration information provided by the administrator (subject to the maximum distance parameter determined in step 606). The system may assign the first primary data chunk on a particular disk to any location that is aligned to a track boundary or block boundary. Subsequent primary data chunks are then assigned relative to the first primary data chunk. In addition, the system generally assigns primary data chunks so that they are aligned with corresponding physical locations on each of the physical storage devices in the mass storage subsystem.

After assigning the locations of the primary data chunks, processing proceeds to step 612, where the system assigns the spillover data chunks. As discussed above, spillover chunks are assigned locations proximate to a corresponding primary data chunk. The system assigns a number of spillover data chunks for each primary data chunk based on an expected number of modifications that the system expects for each primary chunk. The number of spillover data chunks allocated may be specified directly by an administrator or may be determined based on a specified size of the first portion of the mass storage subsystem. Processing then proceeds to step 614, where the system assigns the remaining chunks in the mass storage subsystem to the second division by assigning them as residual chunks in the data layout.

Figure 7:
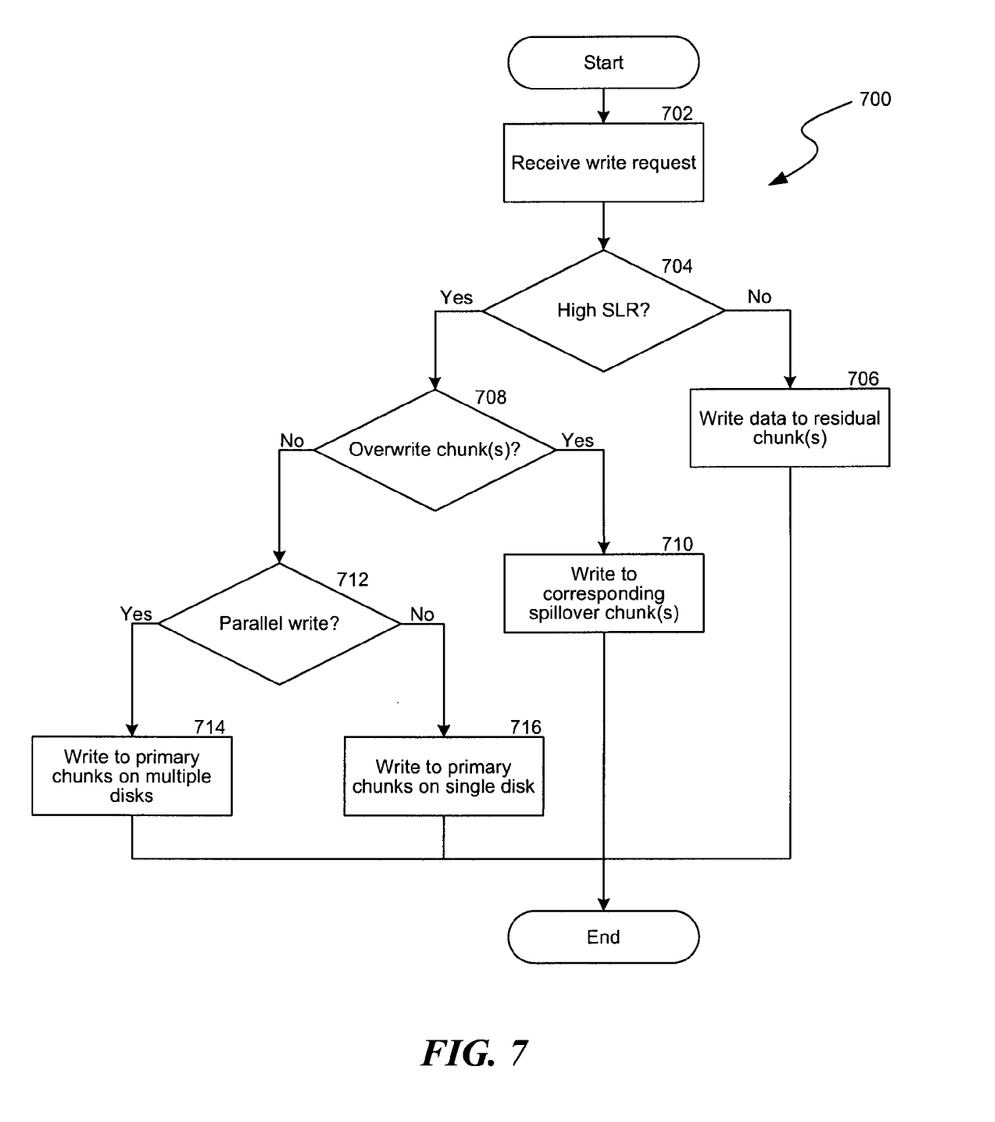
FIG. 7 is a logical block diagram of a process for executing a write operation according to the data layout system.

FIG. 7 is a logical block diagram of a process 700 for executing a write operation according to the data layout system. The steps of the process 700 can be executed by the write component 520 of FIG. 5. The steps are generally carried out by the file system layout layer 315 of the storage operating system 300 (FIG. 3). Processing begins at step 702, where the system receives a write request. The write request may direct the system to create a new data object or to modify part of a previously stored data object. As noted above, write requests are received from the storage manager 305 (FIG. 3) and may combine multiple requests from the hosts 102. The process 700 handles every write request identically, regardless of whether the storage manager 305 aggregates requests or sends requests individually. After receiving the write request, processing proceeds to decision step 704, where the system determines if the data object associated with the write request has a high SLR. The SLR for an individual data object may be specified by an administrator prior to the write request being sent or may be determined automatically based on the type of the data object (e.g., configuration data, user data). SLR information may be stored with the data object as part of its metadata or may be independently stored by the system in a system configuration database. In some configurations, the SLR data is simply a flag indicating that a particular object has a high SLR or a low SLR. In other configurations, the SLR data may specify a selected SLR from a set of multiple possible SLRs supported by the system. In these configurations, the SLR data may store an identifier associated with the specified SLR. If the system determines that the data object does not have a high SLR, processing proceeds to step 706, where the system writes the data to residual data chunks (i.e., to the low priority division). The data may be laid out in the residual data chunks according to any known file system layout independently of the data layout used for the high priority portion.

If the system determines that the data object has a high SLR, processing proceeds to decision step 708, where the system determines if the request is to overwrite data previously written to a data chunk in the high priority division. If the system determines that the write request is to overwrite an existing data chunk, processing proceeds to step 710, where the system writes to a corresponding spillover data chunk associated with the target data chunk. As discussed above, a corresponding spillover chunk is a spillover chunk located in proximity to a particular primary data chunk. Thus, when a first request is received to modify an individual chunk, the system will write the data to a spillover chunk located in proximity to the primary data chunk being modified. Later, when the system receives a second request to modify the same data chunk, the system writes the new data to another of the spillover data chunks located in proximity to the original primary data chunk.

If the system determines that the write request is not to overwrite an existing data chunk, processing proceeds to decision step 712, where the system determines if the write should be handled as a parallel write. Because mass storage subsystems generally consist of multiple physical storage devices of the same type, the system can achieve additional efficiency for high-priority objects by dividing the data up so that it is written in parallel to locations on multiple disks. This may be done in response to determining that the object being written is larger than a certain size. For example, the system may be configured to write to a single disk when the number of data chunks is below half the number of disks in the mass storage subsystem. In this case, writing to a single disk is better, because it avoids the overhead of writing to multiple disks simultaneously. If the system determines that the write request should not be handled as a parallel write, processing proceeds to step 716, where the system writes to primary data chunks on a single disk. The data is placed on a single disk such that it is stored in a set of neighboring primary data chunks. This allows the system to take advantage of the constant seek speed for chunks located within the maximum distance.

If the system determines that a the data should be stored using a parallel write, processing proceeds to step 714, where the system writes the data to primary data chunks on multiple disks. In one embodiment, the system divides the data into segments and stores each segment in primary data chunks at the same locations (i.e., the same physical addresses) on each of the multiple disks. This enables the system to ensure that the parallel data can be accessed with roughly equal time to seek to the particular location. After the data has been stored to the proper locations, the process 700 exits.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for laying out data on a mass storage subsystem, the method performed by a computing system having a processor and an associated storage area, the method comprising:
   determining, by the computing system, a set of physical properties associated with the mass storage subsystem;
   determining, by the computing system, a data chunk width and a maximum separation based on the set of physical properties;
   defining, by the computing system, a first logical portion of the data storage of the mass storage subsystem based on the determined data chunk width and the determined maximum separation, wherein the first logical portion includes a plurality of data chunks on the mass storage subsystem, each data chunk having a width equal to the determined data chunk width;
   defining, by the computing system, a second logical portion of the data storage of the mass storage subsystem, wherein the second logical portion is separate from the first logical portion;
   receiving, by the computing system, a write request specifying data to be written to the mass storage subsystem;
   determining, by the computing system, a level of service associated with the write request; and
   selectively writing the data to one of the first logical portion or the second logical portion based on the determined level of service.

2. The method of claim 1, wherein the data chunk width is determined based on a track size or a block size of a physical storage device in the mass storage subsystem.

3. The method of claim 1, wherein the plurality of data chunks comprises a plurality of physically separate primary data chunks, wherein neighboring primary data chunks of the primary data chunks are separated by less than the maximum separation, and wherein the maximum separation is determined based on a seek speed of a physical storage device in the mass storage subsystem.

4. The method of claim 1, wherein the mass storage subsystem comprises a first physical storage device and a second physical storage device and wherein selectively writing the data comprises storing a first portion of the data at a selected physical address on the first physical storage device and storing a second portion of the data at the selected physical address on the second physical storage device.

5. The method of claim 1, wherein the first logical portion includes primary data chunks and spillover data chunks located in proximity to the primary data chunks, the method further comprising:
   in response to a first write request, storing a portion of the data in one of the primary data chunks; and
   in response to a second write request modifying the portion of the data, storing a modified portion of the data in one of the spillover data chunk proximate to the primary data chunk.

6. The method of claim 1, wherein the mass storage subsystem comprises a plurality of physical storage devices and wherein storing the data comprises storing portions of the data on more than one of the physical storage devices in response to determining that the size of the data is greater than a specified size.

7. A storage system comprising:
a memory;
a processor coupled to the memory;
a storage interface configured to communicate with a mass storage subsystem;
a data layout structure containing data defining a first logical portion and a second logical portion of the mass storage subsystem;
a properties component configured to determine one or more physical properties of the mass storage subsystem;
a layout component configured to assign portions of the mass storage subsystem to the first logical portion and the second logical portion based on the one or more physical properties; and
a write component configured to receive a write request, determine a service level requirement associated with the write request, and selectively store data in the first logical portion or the second logical portion based on the service level requirement.

8. The storage system of claim 7, wherein the first logical portion comprises a plurality of data chunks having a specified width, and wherein the layout component is configured to determine the specified width based on a maximum amount of data that can be read from a physical storage device in the mass storage subsystem in a single read operation.

9. The storage system of claim 7, wherein the first logical portion comprises a plurality of non-adjacent primary data chunks and wherein the layout component is configured to specify the plurality of primary data chunks such that neighboring primary data chunks of the plurality of primary data chunks are separated by less than a maximum distance determined based on a seek speed of a physical storage device in the mass storage subsystem.

10. The storage system of claim 7, wherein the mass storage subsystem comprises multiple physical storage devices and wherein the write component is configured to store the data on a single physical storage device of the multiple physical storage devices.

11. The storage system of claim 7, wherein the first logical portion includes a plurality of primary data chunks on the mass storage subsystem and a plurality of spillover data chunks on the mass storage subsystem located in proximity to the primary data chunks, wherein the write component is configured to store data in the primary data chunks in response to a first write request and to store data in a spillover data chunk proximate to an associated primary data chunk in response to a second write request that modifies data in the associated primary data chunk.

12. The storage system of claim 7, wherein the mass storage subsystem comprises a plurality of physical storage devices and wherein the write component is configured to store data by storing portions of the data on more than one of the physical storage devices in response to determining that the size of the data is greater than a specified size.

13. The apparatus of claim 7, wherein the first logical portion is assigned such that read operations directed to data in the first logical portion are faster than read operations directed to data in the second logical portion.

14. The apparatus of claim 7, wherein the first logical portion is assigned such that reads of data in the first logical portion are faster than reads of data in the second logical portion and wherein the write component is further configured to store the data in the first logical portion in response to determining that the service level requirement requires high efficiency.

15. A method for laying out data on a mass storage subsystem, the method performed by a computing system having a processor and an associated storage area, the method comprising:
defining, by the computing system, a first logical portion and a second logical portion of the mass storage subsystem based on one or more physical properties associated with the mass storage subsystem, such that read access to data stored in the first logical portion is faster than read access to data stored in the second logical portion.
storing, by the computing system, a first object in the first logical portion, wherein the first object has a first service level requirement; and
storing, by the computing system, a second object in the second logical portion, wherein the second object has a second service level requirement which is lower than the first service level requirement.

16. The method of claim 15, wherein the first logical portion comprises a plurality of data chunks having a specified width and wherein the specified width is determined based on a track size or a block size of a physical storage device in the mass storage subsystem.

17. The method of claim 15, wherein the first logical portion comprises a plurality of non-adjacent primary data chunks on the mass storage subsystem, wherein the primary data chunks are separated by less than a maximum distance, the maximum distance determined based on a seek speed of a physical storage device in the mass storage subsystem.

18. The method of claim 15, wherein the mass storage subsystem comprises multiple physical storage devices and wherein storing the first object comprises storing data associated with the first object on a single physical storage device of the multiple physical storage devices.

19. The method of claim 15, wherein the mass storage subsystem comprises a first physical storage device and a second physical storage device and wherein storing the object comprises storing a first portion of the object at a selected physical address on the first physical storage device and storing a second portion of the object at the selected physical address on the second physical storage device.

20. The method of claim 15, wherein the first logical portion includes primary data chunks and spillover data chunks located in proximity to the primary data chunks, wherein storing the first object comprises:
during a first write operation, storing data associated with the first object in the primary data chunks; and
during a second write operation, storing data in a spillover data chunk when data stored in the proximate primary data chunk is modified by the second write operation.

21. The method of claim 15, wherein the mass storage subsystem comprises a plurality of physical storage devices and wherein storing the first object comprises storing portions of the first object on more than one of the physical storage devices in response to determining that the size of the first object is greater than a specified size.

22. A method for determining a logical data layout on a mass storage subsystem, the method performed by a computing system having a processor and an associated storage area, the method comprising:
determining, by the computing system, a data chunk width based on a maximum amount of data that can be read from a physical storage device in the mass storage subsystem in a single read operation;
determining, by the computing system, a seek profile of the physical storage device;

based, by the computing system, on the seek profile, determining a maximum seek distance that has a substantially constant seek time on the physical storage device;

using, by the computing system, the data chunk width and the maximum seek distance to define the logical data layout.

23. The method of claim 22, wherein the logical data layout includes a plurality of data chunks and wherein each data chunk of the plurality of data chunks has a width equal to the determined data chunk width.

24. The method of claim 22, wherein the logical data layout includes a plurality of primary data chunks and wherein the primary data chunks are non-adjacent and are separated by less than the maximum seek distance.

25. The method of claim 24, wherein the logical data layout further includes a plurality of spillover data chunks located in proximity to the primary data chunks, such that each primary data chunk is associated with one or more spillover data chunks of the plurality of spillover data chunks.

* * * * *

UNITED STATES PATENT AND TRADEMARK OFFICE
CERTIFICATE OF CORRECTION

| | |
|---|---|
| PATENT NO. | : 8,621,176 B2 |
| APPLICATION NO. | : 12/690849 |
| DATED | : December 31, 2013 |
| INVENTOR(S) | : Jiri Schindler |

It is certified that error appears in the above-identified patent and that said Letters Patent is hereby corrected as shown below:

In the Specification

In column 13, line 58, after "that" delete "a".

In the Claims

In column 15, line 57, in claim 13, delete "apparatus" and insert -- storage system --, therefor.

In column 15, line 61, in claim 14, delete "apparatus" and insert -- storage system --, therefor.

In column 16, line 11, in claim 15, delete "portion." and insert -- portion; --, therefor.

Signed and Sealed this
Fifteenth Day of April, 2014

Michelle K. Lee
*Deputy Director of the United States Patent and Trademark Office*